United States Patent [19]
Betts et al.

[11] Patent Number: 5,820,250
[45] Date of Patent: Oct. 13, 1998

[54] DARK FIELD ILLUMINATOR RINGLIGHT ADAPTOR

[75] Inventors: Robert Betts, Newbury; Joseph J. Muratore, Chelmsford, both of Mass.; Brian C. Jones, Rochester, N.Y.

[73] Assignee: Dolan-Jenner Industries, Inc., Lawrence, Mass.

[21] Appl. No.: 547,507

[22] Filed: Oct. 24, 1995

[51] Int. Cl.⁶ ............................................. F21S 5/00
[52] U.S. Cl. ........................ 362/216; 362/32; 362/277; 362/307; 362/351; 359/387
[58] Field of Search ..................... 356/237, 239; 359/385, 387, 389, 799, 798; 362/32, 33, 216, 277, 319, 304, 305, 307, 351, 360, 361

[56] References Cited

U.S. PATENT DOCUMENTS

| | | | |
|---|---|---|---|
| 4,160,578 | 7/1979 | Gottlieb et al. | 359/387 |
| 4,626,079 | 12/1986 | Nakamura et al. | 359/387 |
| 4,687,304 | 8/1987 | Piller et al. | 359/387 |
| 4,706,168 | 11/1987 | Weisner | 362/18 |
| 4,779,967 | 10/1988 | Murphy et al. | 359/387 |
| 4,974,094 | 11/1990 | Morito | 362/32 |
| 5,268,749 | 12/1993 | Weber et al. | 359/387 |
| 5,325,231 | 6/1994 | Tamura et al. | 359/387 |

FOREIGN PATENT DOCUMENTS

| | | |
|---|---|---|
| 0 019 309 A1 | 11/1980 | European Pat. Off. . |
| 0 504 940 A2 | 9/1992 | European Pat. Off. . |
| 3100662 | 11/1981 | Germany ............................... 359/387 |

OTHER PUBLICATIONS

D.S. Goodman, "Illuminators Based on Fiber Rings," *Applied Optics*, 24(11):1560–1562 (Jun. 1, 1985).

*Primary Examiner*—Alan Cariaso
*Attorney, Agent, or Firm*—Hamilton, Brook, Smith & Reynolds, P.C.

[57] ABSTRACT

A system enabling conversion of a conventional ringlight for differential illumination such as dark field or Rheinberg illumination is disclosed. The system comprises a ringlight having an annular light emitting portion and a hood that fits over the ringlight. The hood has an aperture and an annular reflective surface, disposed opposite the light emitting portion, that reflects the light from the ringlight through the aperture. An angle of the annular reflective surface is selected relative to a direction of light from the ringlight to form a cone of light exiting the aperture. To ensure good contrast, a light baffle in the form of a sleeve, inserted into the ringlight, may be incorporated to prevent stray light from the ringlight from directly exiting through the aperture. The differential illumination produced by the invention is applicable to machine vision applications, but also microscopy, gemology, and serology, for example.

15 Claims, 4 Drawing Sheets

DARK FIELD ILLUMINATOR RINGLIGHT ADAPTOR

BACKGROUND OF THE INVENTION

Many diverse methods of optical imaging and assisted viewing require some type of specimen illumination. Microscopes magnify light from only a small area with a concomitant reduction in light intensity. This necessitates intense illumination of the specimen in order to provide adequate light levels for viewing. Machine vision applications often achieve better performance with intense illumination, which provides better resolution of the workpiece's or specimen's details. Identifying workpiece edges and surface features allows the position and orientation to be determined automatically.

Generally the lighting can originate from in front of or behind the specimen. Microscopes commonly use backlighting with a light source below a specimen stage that directs light upward through a microscope slide held on the stage to its first optical element, or the microscope objective. This lighting configuration is typically used for a transparent or translucent specimen since the light must pass through the specimen to be captured by the microscope. Light sourced from above the specimen is typically used with opaque specimens.

When lighting from above the specimen, a problem stems from the fact that a single point light source can not be located in line with the microscope's optical axis without obstructing its view or a complex optical arrangement. The specimen is usually illuminated from light off the axis which can create shadows. The solution to this dilemma is a device termed a ringlight. This device is typically torroidal in shape to fit around the barrel of the microscope or similar optical apparatus. The barrel and ringlight are arranged so that the barrel is coextensive with the ringlight's axis. The ringlight emits light in a 360 degree circle in the general direction of its axis, but angling inward slightly. This forms a cone of light having a vertex located on the axis. When used as a microscope light, for example, the specimen is illuminated evenly from all sides without shadows being visible through the microscope.

There are a number of variations on the backlighting theme. One such variation is a form of differential illumination termed dark field illumination. Many specimens exhibit little or no contrast when viewed with ordinary backlighting because they are colorless and transparent. Chemical staining is the typical solution in this situation, but in some cases it may be undesirable. In dark field illumination, the specimen is illuminated with a hollow cone of light aligned along the optical axis of the microscope and originating from below the specimen. The microscope objective is located within the dark base of the hollow light cone. Consequently, without a specimen, there is no illumination in the microscope. A specimen placed on the stage, however, tends to diffract, reflect, and refract light of the cone, and this scattered light can then enter the objective. When observed through the microscope, live bacteria, for example, are visible, their edges and internal structures being outlined by redirected light, which is collected by the microscope optics. Rheinberg differential illumination is similar except that the field is given a desired color with diffuse lighting.

SUMMARY OF THE INVENTION

The present invention concerns a differential illumination system that uses a ringlight or similar source of electromagnetic radiation. Light from the ringlight is redirected to form a cone of light projecting upward and away from the system. This enables dark field or Rheinberg illumination, for example. As a result, if desired the invention may be used to retrofit conventional ringlights, adapted for general purpose illumination, for these specialized techniques.

In general, according to one aspect, the invention features an illumination system. The system comprises a ringlight having an annular light emitting portion and a hood that fits over the ringlight. The hood has an aperture and an annular reflective surface, disposed opposite the light emitting portion, that reflects the light from the ringlight through the aperture.

In specific embodiments, the ringlight receives light via a fiber optic bundle and the annular light emitting portion comprises a ring of these fibers from the bundle.

When adapted for differential illumination such as dark field or Rheinberg illumination, an angle of the annular reflective surface is selected relative to a direction of light from the ringlight to form a cone of light exiting the aperture. To ensure good contrast, a light baffle may be incorporated to prevent stray light from the ringlight from directly exiting through the aperture. This baffle is preferably formed from a sleeve inserted into a center bore of the ringlight. If a diffuse cone is desired, a diffusion screen may be also added. Further, a field illumination light source may be added to emit a diffused light to enable the Rheinberg differential illumination.

In general, according to another aspect, the invention may also be characterized as a system for converting a ringlight, which is adapted for conventional illumination, to provide differential illumination. Such a system would comprise the hood that has been adapted to fit over the ringlight to properly redirect the output from it.

In general, according to another aspect, the invention may also be characterized as a method for converting a ringlight for differential illumination in a viewing device, such as a microscope. This method comprises blocking light from the ringlight from being transmitted directly into the viewing device. The light from the ringlight, however, is reflected to form a hollow cone of light. An objective of the viewing device is then placed within the hollow cone of light. This enables dark field viewing since only structures within a specimen will direct light to the viewing device.

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DESCRIPTION OF PREFERRED EMBODIMENTS

Figure 1:
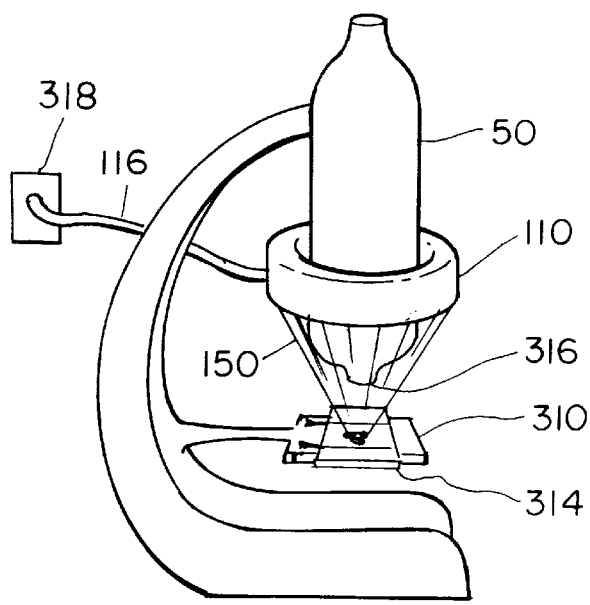
FIG. 1 illustrates the prior art use of a ringlight as a light source positioned above the specimen.

Turning now to the drawings, FIG. 1 illustrates the typical application of a conventional ringlight as a microscope illuminator. The ringlight 110 is attached to the barrel of a microscope 50. It generates a cone of light 150 which is directed downward to the stage 310 to illuminate a specimen on slide 314. The ringlight itself receives light via a fiber optic cable 116 from a source 318.

Figure 2:
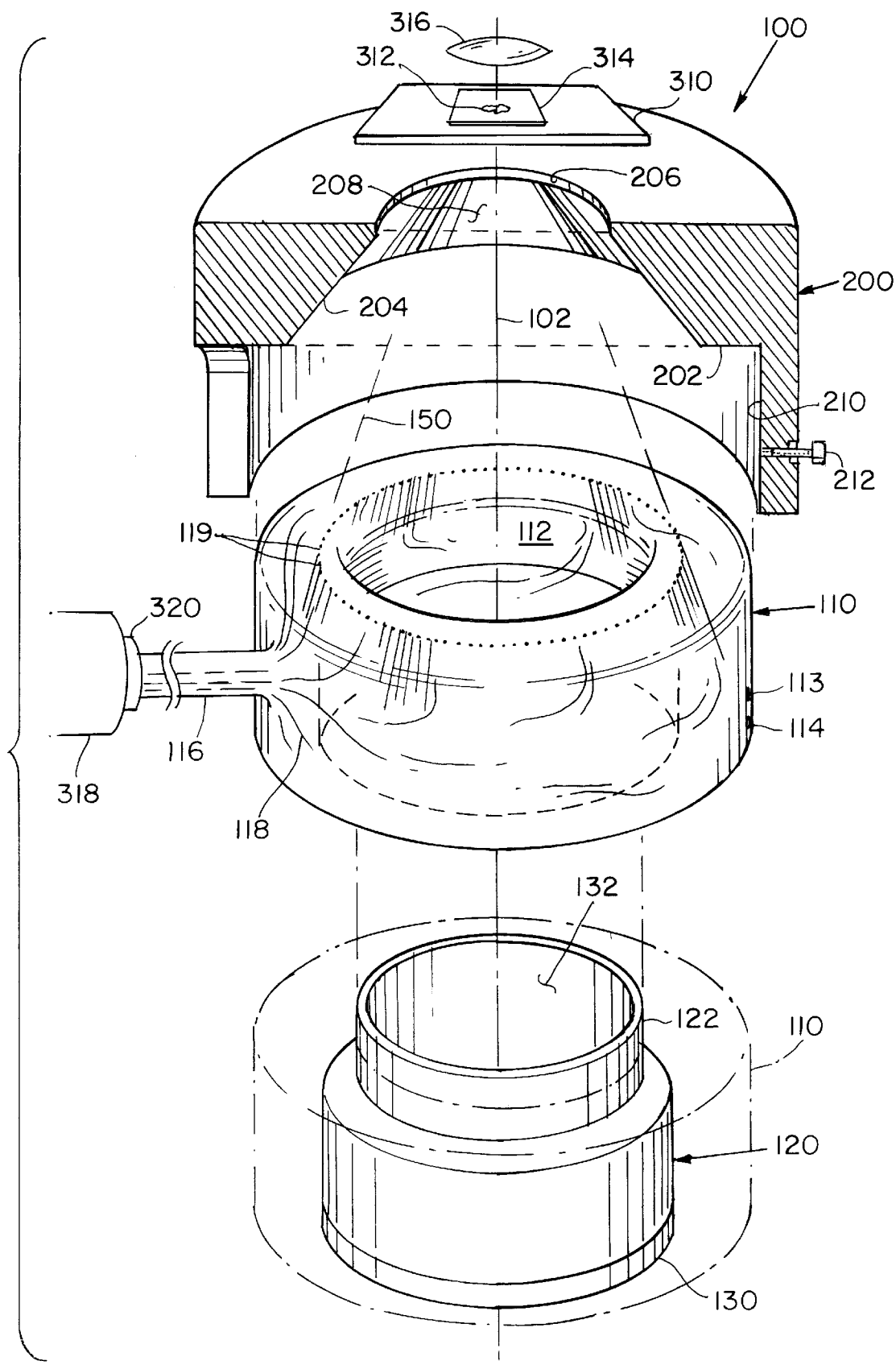
FIG. 2 is a perspective and exploded view of a differential illumination system of the present invention configured for dark field illumination and showing a partial cut-away in the ringlight adaptor-reflector hood.

FIG. 2 shows a differential illumination system 100 based on the conventional ringlight 110 that has been constructed according to the principles of the present invention. The system 100 comprises a reflector hood 200 that fits over the ringlight 110. An inner sleeve 120 is press fit into the center aperture 112 of the ringlight 110. Finally, an end cap 130 covers a center cavity 132 defined by the inner surface of the sleeve 120 to form a dark field stop at the bottom of the illuminator 100. This prevents light seepage into the center cavity 132.

In operation, the system 100 is located under a microscope stage 310 to illuminate a specimen 312 held on slide 314. The microscope objective 316 captures light for viewing by a user or imaged on a charge coupled device, for example.

The hood 200 is preferably constructed from machined aluminum and has a non-reflecting, light absorbent, finish on most of its outer surfaces. Black anodization is one possible technique for achieving these surface characteristics. The hood 200 is generally cylindrical with a bore 202 extending axially through the hood. The proximal end 204 of the bore is frustro-conical, a terminal end of which is a light emitting aperture 206. The frustro-conical portion of the bore yields an inner chamfered surface 208 that is polished for maximum light reflectance. The light reflecting surface 208 is angled at approximately 45 degrees, preferably 42 degrees with respect to the central axis 102. The distal end 210 of the bore is essentially cylindrical and is sized to receive the ringlight 110.

The ringlight 110 is installed into the distal end 210 of the bore. In one embodiment it is held in place by a bolt 212 threaded into the hood 200 and engaging a dimple 112 in the outer surface of ringlight 110. Indexing may be provided by forming multiple dimples 114 axially along the outer surface of the ringlight 110 to enable height adjustment of the ringlight 110 within the hood 200.

The ringlight 110 is preferably a fiber optic type light system such as the Dolan-Jenner ringlight Model No. A3739P. A fiber optic bundle 116 connects to receive light from a light source 318. The bundle 116 may be glass, plastic or quartz fibers, to list a few alternatives. At the point of connection a light filter 320 can be added to adapt the color of the light for Rheinberg differential color illumination, for example. Light from the source 318 is coupled into the bundle 116 and transmitted to the ringlight 110. There, the individual fibers 118 are separated and dispersed evenly around the circumference of the ringlight. The terminal end 119 of the fibers 118 are aligned generally axially but angled inward slightly, 18 degrees in the particular ringlight illustrated, to generate a cone of light 150 having an acute angle vertex.

Other types of ringlights are compatible with the invention. For example, using a circle of light emitting diodes on the housing of the ringlight might be preferred in applications in which it is difficult to accommodate the thick fiber optic bundle 116.

Figure 3:
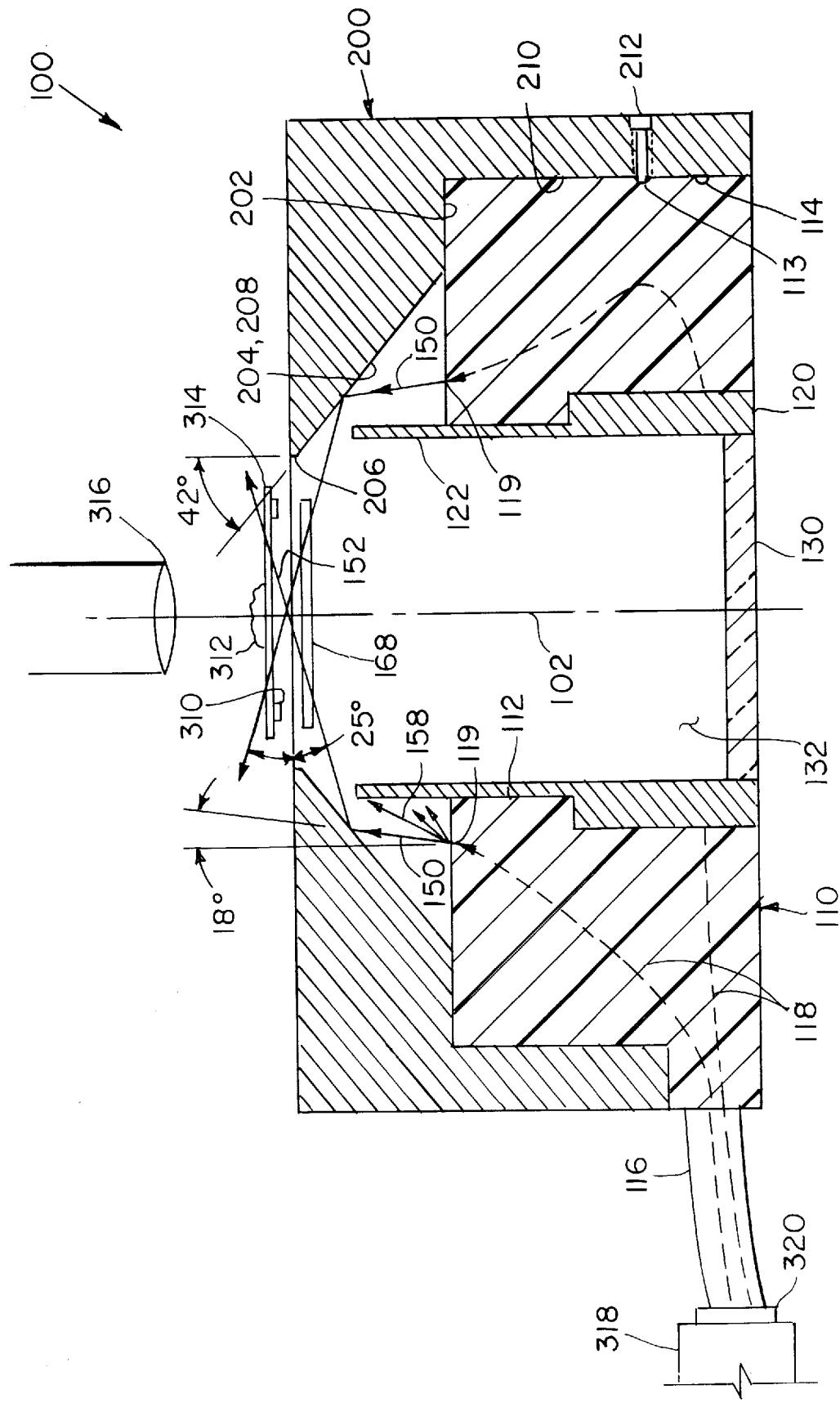
FIG. 3 is cross-sectional view of the inventive dark field illuminator.

As best shown in FIG. 3, the light 150 emitted from the ringlight is reflected off of the light reflective surface 208 of the hood 200. The light then travels out through the light emitting aperture 206. The light exiting the aperture is substantially 25 degrees from horizontal. The result is a hollow light cone 152 projecting upward from the aperture 206. The trajectory of the light is such that it will not enter the light collection optics 316 of the imaging device, the microscope objective. The specimen 312 placed on the slide 314 will tend to reflect, refract, and diffract light toward the microscope objective 116, however.

In some applications, a more diffuse light cone may be desirable. A diffusion screen 168 may be added in these cases. The preferred location is across the aperture 206.

The inner sleeve 120 functions as a light baffle. Good contrast in dark field illumination requires keeping light from the illuminator 100 only in the hollow cone 152. The fibers, however, tend to emit a portion of the light off of their central axes, see 158. The inner sleeve 120 has an extension 122, which is beyond the top of the ringlight so that light from the fibers cannot directly exit the illuminator 100. Only light that is reflected from the reflective surface 208 of the hood 200 is able to exit.

Figure 4A:
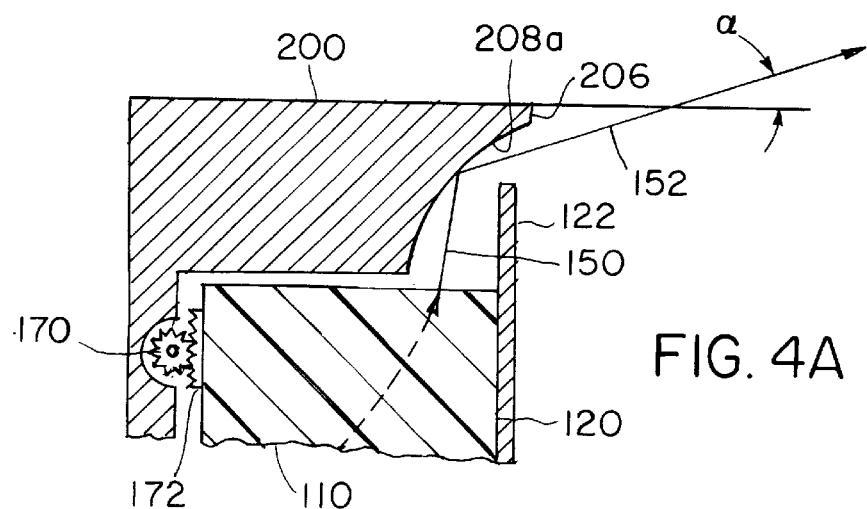
FIGS. 4A, 4B, and 4C are partial cross-sectional views showing the illuminator with a modification for providing adjustment of the angle of the light cone.
Figure 4B:
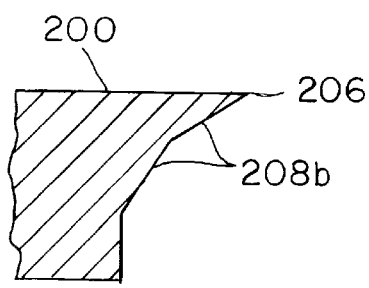
Figure 4C:
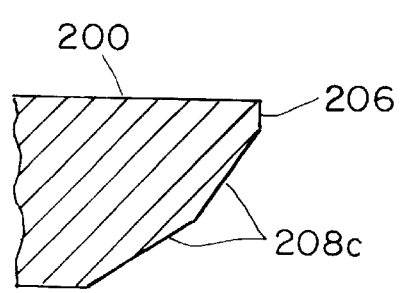

FIGS. 4A, 4B, and 4C show alternative embodiments that enable adjustability in the angle of the light cone 152. As shown in FIG. 4A, the light reflecting surface is machined to have a concave continuously curved or arcuate cross-section 208a. As a result, the angle $\alpha$ of the light cone 152 is dependent upon the location at which the incident beam 150 reflects off the arcuate reflecting surface 208a. This location is adjusted by changing the height of the ringlight 110 in the hood 200.

Although the multiple dimples 114 and bolt 212 of FIGS. 2 and 3 are one solution to indexing the height of the ringlight, continuous adjustment is usually preferable in this embodiment. Thus, in one solution, a rack 172 is attached to the ringlight 110. The rack 172 is engaged by a pinion gear 170 on the hood 200. The gear is then turned by an operator to change the height.

As a side note, it will be recognized that this embodiment works best with a tight, well collimated beam 150 from the ringlight 110. Stray light will tend to be reflected at divergent angles off of the arcuate surface 208a which may blur the edges of the light cone 152.

FIG. 4B shows another embodiment 208b of the light reflecting surface. This embodiment also has an overall curved light reflecting surface but having two discrete angles to enable generation of light cones of two angles. FIG. 4C is still another embodiment also having two angles, but arranged in a generally convex configuration.

Figure 5:
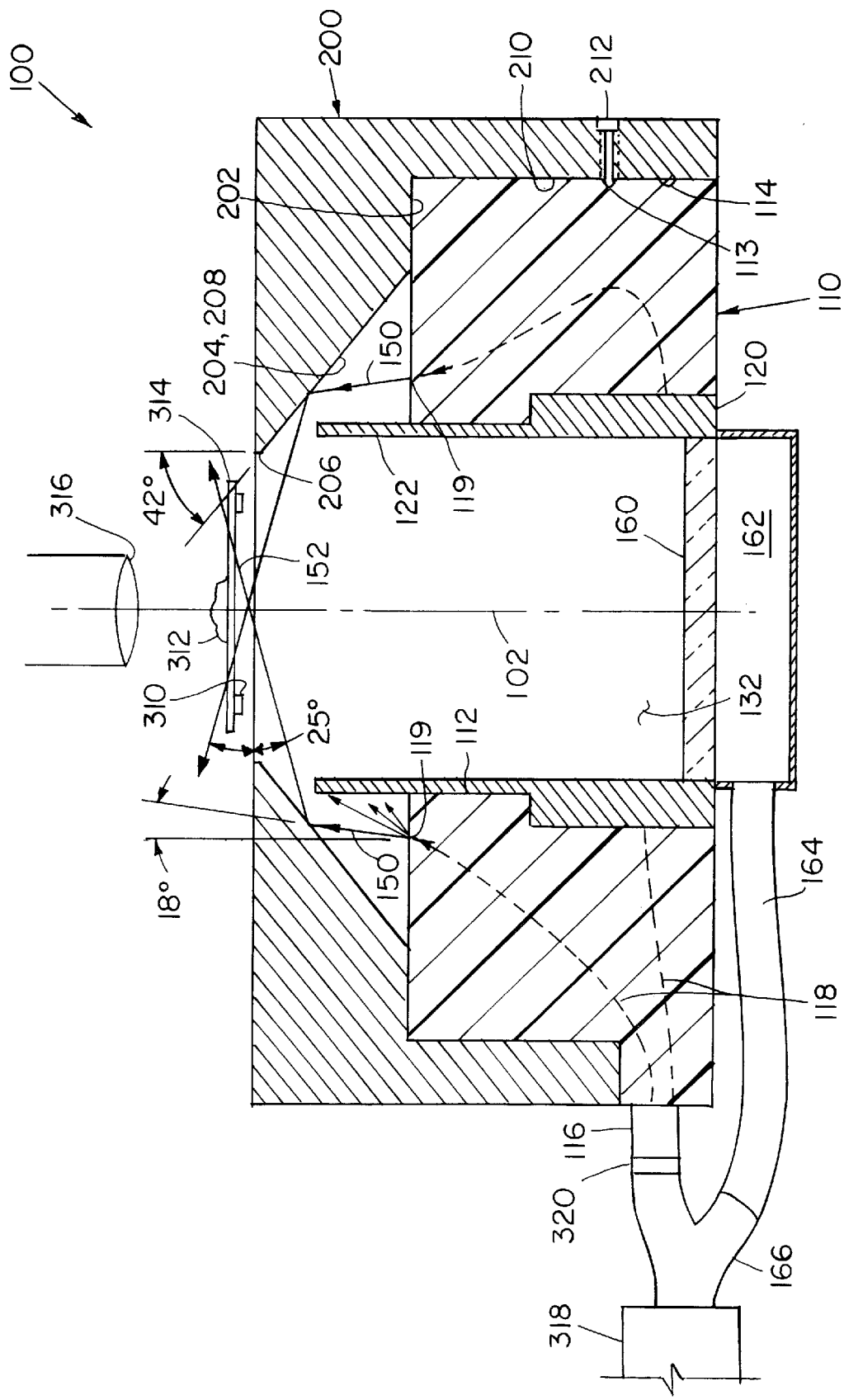
FIG. 5 shows a modification of the inventive illuminator for Rheinberg differential color illumination.

As shown in FIG. 5, the illuminator 100 may be modified for Rheinberg differential color illumination. This is an extension of the dark field viewing in which the field is given a desired color rather than simply being without light. In this application, the end cap 130 is replaced with a field color filter 160, and an integrating chamber 162 is placed below this filter. The chamber receives light from a second fiber optic bundle 164. Similar chambers or diffusers are disclosed in U.S. Pat. No. 5,102,227, entitled "Lighting and Detection System", by Zwirner, et al., which is incorporated herein in its entirety. The bundle 164 can be connected to a separate source of light, or if a splitter 166 is available, connected to light source 318.

The filtered light from filter 160 determines the color of the field. In many cases the color filter 320 may be used to color the light to the ringlight 110 to enhance the differential color between the specimen and the background as viewed in the microscope.

The light passing through the filter 160 is preferably diffuse. For some application, however, it may be preferable to generate hard edge outlines of the specimen by using a source of collimated light.

While this invention has been particularly shown and described with references to preferred embodiments thereof, it will be understood by those skilled in the art that various changes in form and details may be made therein without departing from the spirit and scope of the invention as defined by the appended claims. For example, although the invention is described in the context of microscope viewing, it is also applicable to differential illumination in serology, gemology, and machine vision applications and other similar imaging uses.

We claim:

1. An illumination system, comprising:

a ringlight having an annular light emitting portion;

a hood having an aperture and an annular reflective surface disposed opposite the light emitting portion for reflecting the light from the ringlight through the aperture; and a light baffle sleeve that is inserted into a center bore of the ringlight to prevent light from the ringlight from directly exiting through the aperture.

2. An illumination system as described in claim 1, wherein the ringlight receives light via a fiber optic bundle.

3. An illumination system as described in claim 2, wherein the annular light emitting portion comprises a ring of fibers from the fiber optic bundle.

4. An illumination system as described in claim 1, wherein an angle of the annular reflective surface is selected relative to a direction of light from the ringlight to form a cone of light exiting the aperture.

5. An illumination system as described in claim 1, further comprising a field illumination light source for emitting light parallel to an axis of the ringlight.

6. An illumination system, comprising:

a ringlight having an annular light emitting portion;

a hood having an aperture and an annular reflective surface disposed opposite the light emitting portion for reflecting the light from the ringlight through the aperture; and means for adjusting the distance between the ringlight and the annular reflective surface.

7. An illumination system as described in claim 6, wherein the annular reflective surface is curved to change an angle of the light exiting the aperture in response to changes in the distance between the ringlight and the reflective surface.

8. An illumination system as described in claim 7, wherein the reflective surface has a continuous curvature.

9. An illumination system as described in claim 6, further comprising a light baffle sleeve that is inserted into a center bore of the ringlight to prevent light from the ringlight from directly exiting through the aperture.

10. A system for converting a ringlight for differential illumination, the system comprising:

a hood adapted to fit over the ringlight, the hood having an aperture and an annular reflective surface for reflecting light from the ringlight through the aperture; and a light baffle sleeve that is inserted into a center bore of the ringlight to prevent stray light from the ringlight from directly exiting through the aperture.

11. A system as described in claim 10, wherein an angle of the annular reflective surface is selected relative to a direction of light from the ringlight to generate a cone of light exiting the aperture.

12. A system as described in claim 10, further comprising a field illumination light source for emitting light parallel to an axis of the ringlight.

13. A system as described in claim 12, further comprising a filter for changing a color of the light from the light source.

14. A method for converting a ringlight for differential illumination from viewing device, the method comprising:

blocking light from the ringlight from being transmitted directly into the viewing device with a sleeve inserted into a center bore of the ringlight;

reflecting the light from the ringlight to form a hollow cone of light; and positioning an objective of the viewing device within the hollow cone of light.

15. A method as described in claim 14, further comprising emitting light within the hollow cone of light from the ringlight.

* * * * *